US010683447B2

(12) United States Patent
Wagle et al.

(10) Patent No.: US 10,683,447 B2
(45) Date of Patent: Jun. 16, 2020

(54) INVERT EMULSION BASED DRILLING FLUID AND METHODS OF USING SAME

(71) Applicant: Saudi Arabian Oil Company, Dhahran (SA)

(72) Inventors: Vikrant Wagle, Abqaiq (SA); Abdullah Al-Yami, Dhahran (SA); Nasser AlHareth, Ras Tanura (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/612,397

(22) Filed: Jun. 2, 2017

(65) Prior Publication Data

US 2018/0223166 A1  Aug. 9, 2018

Related U.S. Application Data

(60) Provisional application No. 62/454,189, filed on Feb. 3, 2017, provisional application No. 62/454,192, filed on Feb. 3, 2017.

(51) Int. Cl.
*C09K 8/467* (2006.01)
*C09K 8/24* (2006.01)
(Continued)

(52) U.S. Cl.
CPC ............ *C09K 8/24* (2013.01); *B01F 17/0021* (2013.01); *B01F 17/0042* (2013.01); *B01F 17/0092* (2013.01); *C04B 7/527* (2013.01); *C04B 14/06* (2013.01); *C04B 24/02* (2013.01); *C04B 24/026* (2013.01); *C04B 24/085* (2013.01); *C04B 28/02* (2013.01); *C04B 28/04* (2013.01); *C04B 28/08* (2013.01); *C04B 38/02* (2013.01); *C09K 8/032* (2013.01); *C09K 8/035* (2013.01); *C09K 8/04* (2013.01); *C09K 8/08* (2013.01); *C09K 8/20* (2013.01); *C09K 8/22* (2013.01); *C09K 8/32* (2013.01); *C09K 8/36* (2013.01); *C09K 8/40* (2013.01); *C09K 8/424* (2013.01); *C09K 8/46* (2013.01); *C09K 8/467* (2013.01); *C09K 8/48* (2013.01); *C09K 8/487* (2013.01); *C09K 8/74* (2013.01); *C10M 105/18* (2013.01); *C10M 105/62* (2013.01); *C10M 107/34* (2013.01); *C10M 111/04* (2013.01); *C10M 173/00* (2013.01); *C10M 173/02* (2013.01); *E21B 21/00* (2013.01); *E21B 21/002* (2013.01); *E21B 21/003* (2013.01); *E21B 33/14* (2013.01); *E21B 43/25* (2013.01); *C04B 2103/40* (2013.01); *C04B 2103/46* (2013.01); *C04B 2111/00068* (2013.01); *C04B 2201/20* (2013.01); *C09K 2208/12* (2013.01); *C09K 2208/34* (2013.01); *C10M 2201/062* (2013.01); *C10M 2201/08* (2013.01); *C10M 2201/103* (2013.01);
(Continued)

(58) Field of Classification Search
CPC . C09K 8/80; C09K 8/805; C09K 8/62; C09K 8/035; C09K 2208/26; C09K 8/516; C09K 8/42; C09K 8/5758; C09K 8/68; C09K 8/90; C09K 2208/24; C09K 8/44; C09K 8/5751; C09K 8/88; C09K 2208/08; C09K 8/10; C09K 8/40; C09K 8/514; C09K 8/52; C09K 8/5756; C09K 8/685; C09K 8/725; C09K 8/887; C09K 3/00; C09K 8/467; C09K 8/508; C09K 8/60; C09K 8/70; C09K 8/92; E21B 43/267; E21B 33/138; E21B 43/26; E21B 43/16; E21B 43/283
See application file for complete search history.

(56) References Cited

U.S. PATENT DOCUMENTS 2,589,949 A   3/1952  Meadors
2,782,163 A   2/1957  Doyne et al.
(Continued)

FOREIGN PATENT DOCUMENTS

AU     5117264 A    5/1967
CA     2495811 A1   3/2004
(Continued)

OTHER PUBLICATIONS

Non-Final Office Action dated May 4, 2018 pertaining to U.S. Appl. No. 15/628,892, filed Jun. 21, 2017.
International Search Report and Written Opinion dated May 8, 2018 pertaining to International Application No. PCT/US2018/015631.
International Search Report and Written Opinion dated May 14, 2018 pertaining to International Application No. PCT/US2018/015640 filed Jan. 29, 2018, 16 pages.
International Search Report and Written Opinion dated May 9, 2018 pertaining to International Application No. PCT/US2018/015638 filed Jan. 29, 2018, 15 pages.
(Continued)

*Primary Examiner* — Kumar R Bhushan
(74) *Attorney, Agent, or Firm* — Dinsmore & Shohl LLP

(57) ABSTRACT

A drilling fluid composition which includes a base fluid, one or more additives, and a viscosifier package. The base fluid is an invert emulsion comprising oil and water. Further, the one or more additives is chosen from an emulsifier, a weighting material, a fluid-loss control additive, or an alkaline compound. The viscosifier package includes a fatty acid having 6 or more carbon atoms and an aliphatic polyester. The drilling fluid composition has a yield point of from 30 lb/100 ft$^2$ to 100 lb/100 ft$^2$ and a low shear yield point of from 10 lb/100 ft$^2$ to 40 lb/100 ft$^2$. The associated method of drilling a subterranean well including operating a drill in a wellbore in the presence of the drilling fluid composition is also provided.

19 Claims, No Drawings

(51) Int. Cl.

| | | |
|---|---|---|
| E21B 21/00 | (2006.01) |
| C09K 8/22 | (2006.01) |
| C10M 173/00 | (2006.01) |
| C04B 24/02 | (2006.01) |
| C04B 28/02 | (2006.01) |
| C04B 28/04 | (2006.01) |
| C04B 28/08 | (2006.01) |
| C09K 8/74 | (2006.01) |
| E21B 43/25 | (2006.01) |
| C09K 8/03 | (2006.01) |
| C09K 8/20 | (2006.01) |
| B01F 17/00 | (2006.01) |
| C09K 8/40 | (2006.01) |
| E21B 33/14 | (2006.01) |
| C09K 8/035 | (2006.01) |
| C09K 8/08 | (2006.01) |
| C09K 8/42 | (2006.01) |
| C09K 8/48 | (2006.01) |
| C04B 24/08 | (2006.01) |
| C09K 8/487 | (2006.01) |
| C04B 7/52 | (2006.01) |
| C09K 8/46 | (2006.01) |
| C09K 8/04 | (2006.01) |
| C04B 14/06 | (2006.01) |
| C04B 38/02 | (2006.01) |
| C10M 105/18 | (2006.01) |
| C10M 105/62 | (2006.01) |
| C10M 107/34 | (2006.01) |
| C10M 111/04 | (2006.01) |
| C09K 8/32 | (2006.01) |
| C09K 8/36 | (2006.01) |
| C10M 173/02 | (2006.01) |
| C04B 103/40 | (2006.01) |
| C04B 103/46 | (2006.01) |
| C04B 111/00 | (2006.01) |

(52) U.S. Cl.
CPC . *C10M 2207/003* (2013.01); *C10M 2207/046* (2013.01); *C10M 2209/104* (2013.01); *C10M 2209/108* (2013.01); *C10M 2209/1045* (2013.01); *C10M 2215/042* (2013.01); *C10M 2215/08* (2013.01); *C10M 2215/265* (2013.01); *C10M 2215/28* (2013.01); *C10M 2217/044* (2013.01); *C10N 2220/021* (2013.01); *C10N 2220/022* (2013.01); *C10N 2220/032* (2013.01); *C10N 2230/06* (2013.01); *C10N 2240/401* (2013.01); *C10N 2250/022* (2013.01); *Y02W 30/92* (2015.05); *Y02W 30/94* (2015.05)

(56) References Cited

U.S. PATENT DOCUMENTS

| | | |
|---|---|---|
| 2,786,027 A | 3/1957 | Salathiel |
| 3,000,826 A | 9/1961 | Gililland |
| 3,044,959 A | 7/1962 | Martin et al. |
| 3,048,538 A | 8/1962 | Rosenberg et al. |
| 3,319,714 A | 5/1967 | Knox |
| 3,353,603 A | 11/1967 | Knight et al. |
| 3,720,610 A | 3/1973 | Erasmus |
| 3,816,351 A | 6/1974 | Lancz |
| 3,849,316 A | 11/1974 | Motley et al. |
| 3,953,337 A | 4/1976 | Walker et al. |
| 4,140,650 A | 2/1979 | Wilde |
| 4,141,843 A | 2/1979 | Watson |
| 4,172,800 A | 10/1979 | Walker |
| 4,217,231 A | 8/1980 | King |
| 4,280,943 A | 7/1981 | Bivens et al. |
| 4,519,923 A | 5/1985 | Hori et al. |
| 4,561,985 A | 12/1985 | Glass, Jr. |
| 4,588,032 A | 5/1986 | Weigand et al. |
| 4,626,362 A | 12/1986 | Dickert, Jr. et al. |
| 4,658,036 A | 4/1987 | Schilling |
| 4,687,516 A | 8/1987 | Burkhalter et al. |
| 4,704,214 A | 11/1987 | Russell et al. |
| 4,719,021 A | 1/1988 | Branch, III |
| 4,842,065 A | 6/1989 | McClure |
| 5,007,489 A | 4/1991 | Enright et al. |
| 5,016,711 A | 5/1991 | Cowan |
| 5,105,885 A | 4/1992 | Bray et al. |
| 5,109,042 A | 4/1992 | Stephens |
| 5,275,654 A | 1/1994 | Cowan |
| 5,298,070 A | 3/1994 | Cowan |
| 5,314,022 A | 5/1994 | Cowan et al. |
| 5,330,662 A | 7/1994 | Jahnke et al. |
| 5,348,993 A | 9/1994 | Daeumer et al. |
| 5,399,548 A | 3/1995 | Patel |
| 5,474,701 A | 12/1995 | Jaquess et al. |
| RE35,163 E | 2/1996 | Christensen et al. |
| 5,586,608 A | 12/1996 | Clark et al. |
| 5,593,953 A | 1/1997 | Malchow, Jr. |
| 5,593,954 A | 1/1997 | Malchow |
| 5,602,082 A | 2/1997 | Hale et al. |
| 5,618,780 A | 4/1997 | Argillier et al. |
| 5,728,210 A | 3/1998 | Moran et al. |
| 5,744,432 A | 4/1998 | Barnhorst et al. |
| 5,830,831 A | 11/1998 | Chan et al. |
| 5,850,880 A | 12/1998 | Moran et al. |
| 5,996,693 A | 12/1999 | Heathman |
| 6,063,737 A | 5/2000 | Haberman et al. |
| H1932 H | 1/2001 | Heathman et al. |
| 6,258,756 B1 | 7/2001 | Hayatdavoudi |
| 6,267,716 B1 | 7/2001 | Quintero |
| 6,632,779 B1 | 10/2003 | Vollmer et al. |
| 6,803,346 B1 | 10/2004 | Bailey et al. |
| 6,972,274 B1 | 12/2005 | Slikta et al. |
| 6,974,852 B2 | 12/2005 | Stanger et al. |
| 7,081,438 B2 | 7/2006 | Horton |
| 7,262,152 B2 | 8/2007 | Monfreux-Gaillard et al. |
| 7,318,477 B2 | 1/2008 | Hou |
| 7,435,706 B2 | 10/2008 | Mueller et al. |
| 7,799,742 B2 | 9/2010 | Dino |
| 7,893,010 B2 | 2/2011 | Ali et al. |
| 7,951,755 B2 | 5/2011 | Wu et al. |
| 8,252,728 B2 | 8/2012 | Karagianni et al. |
| 8,403,051 B2 | 3/2013 | Huang et al. |
| 8,563,479 B2 | 10/2013 | Amanullah et al. |
| 8,703,658 B2 | 4/2014 | Smith |
| 8,741,989 B2 | 6/2014 | Martin et al. |
| 8,932,997 B2 | 1/2015 | Merli et al. |
| 8,936,111 B2 | 1/2015 | Maghrabi et al. |
| 9,006,151 B2 | 4/2015 | Amanullah et al. |
| 9,034,800 B2 | 5/2015 | Harris et al. |
| 9,127,192 B2 | 9/2015 | Maghrabi et al. |
| 9,175,205 B2 | 11/2015 | Amanullah et al. |
| 10,287,476 B2 | 5/2019 | Al-Yami et al. |
| 10,287,477 B2 | 5/2019 | Al-Yami et al. |
| 10,494,559 B2 | 12/2019 | Al-Yami et al. |
| 2001/0027880 A1 | 10/2001 | Brookey |
| 2003/0017953 A1 | 1/2003 | Horton et al. |
| 2003/0127903 A1 | 7/2003 | Quintero |
| 2004/0108113 A1 | 6/2004 | Luke et al. |
| 2004/0116304 A1 | 6/2004 | Wu et al. |
| 2004/0144537 A1 | 7/2004 | Reddy et al. |
| 2005/0049147 A1* | 3/2005 | Patel ............. C09K 8/36 507/103 |
| 2006/0111245 A1 | 5/2006 | Carbajal et al. |
| 2006/0174805 A1 | 8/2006 | Chatterji et al. |
| 2006/0183842 A1 | 8/2006 | Johnson |
| 2006/0254770 A1 | 11/2006 | Hou |
| 2007/0015678 A1 | 1/2007 | Rodrigues et al. |
| 2007/0093393 A1 | 4/2007 | Navarrete et al. |
| 2007/0191235 A1 | 8/2007 | Mas et al. |
| 2008/0006404 A1 | 1/2008 | Reddy et al. |
| 2008/0194432 A1 | 4/2008 | Heidlas |
| 2008/0171671 A1 | 7/2008 | Mueller et al. |

(56) References Cited

U.S. PATENT DOCUMENTS

| | | |
|---|---|---|
| 2008/0217064 A1 | 9/2008 | Stoian et al. |
| 2008/0308011 A1 | 12/2008 | Brothers et al. |
| 2009/0042746 A1 | 2/2009 | Bailey |
| 2009/0131285 A1 | 5/2009 | Wang et al. |
| 2009/0200033 A1 | 8/2009 | Kakadjian et al. |
| 2009/0260885 A1* | 10/2009 | Pomerleau ............... C09K 8/36 175/65 |
| 2010/0016180 A1 | 1/2010 | Scoggins et al. |
| 2010/0152067 A1 | 6/2010 | McDonald |
| 2010/0152068 A1 | 6/2010 | Hartshorne et al. |
| 2010/0173804 A1 | 7/2010 | Van de Peer et al. |
| 2010/0263863 A1 | 10/2010 | Quintero et al. |
| 2010/0319915 A1* | 12/2010 | Bustos .................. C09K 8/502 166/278 |
| 2010/0326660 A1 | 12/2010 | Ballard et al. |
| 2011/0306524 A1 | 12/2011 | Smith |
| 2012/0000708 A1 | 1/2012 | van Zanten et al. |
| 2012/0018226 A1 | 1/2012 | Nzeadibe et al. |
| 2012/0241155 A1 | 9/2012 | Ali et al. |
| 2012/0329683 A1* | 12/2012 | Droger .................... C09K 8/68 507/219 |
| 2013/0079256 A1 | 3/2013 | Yang et al. |
| 2013/0092376 A1 | 4/2013 | Al-Subhi et al. |
| 2013/0126243 A1 | 5/2013 | Smith |
| 2013/0153232 A1 | 6/2013 | Bobier et al. |
| 2013/0244913 A1 | 9/2013 | Maberry et al. |
| 2013/0303410 A1* | 11/2013 | Wagle .................... C09K 8/36 507/128 |
| 2013/0303411 A1 | 11/2013 | Wagle et al. |
| 2014/0024560 A1 | 1/2014 | Gonzalez Poche et al. |
| 2014/0024561 A1 | 1/2014 | Reddy |
| 2014/0073540 A1 | 3/2014 | Berry et al. |
| 2014/0102809 A1 | 4/2014 | King et al. |
| 2014/0121135 A1 | 5/2014 | Gamage et al. |
| 2014/0213489 A1 | 7/2014 | Smith |
| 2014/0318785 A1 | 10/2014 | Reddy et al. |
| 2014/0332212 A1 | 11/2014 | Ayers et al. |
| 2015/0024975 A1 | 1/2015 | Wagle et al. |
| 2015/0034389 A1 | 2/2015 | Perez |
| 2015/0080273 A1 | 3/2015 | Hatchman et al. |
| 2015/0087563 A1 | 3/2015 | Brege et al. |
| 2015/0159073 A1 | 6/2015 | Assmann et al. |
| 2015/0240142 A1 | 8/2015 | Kefi et al. |
| 2015/0299552 A1 | 10/2015 | Zamora et al. |
| 2016/0009981 A1 | 1/2016 | Teklu et al. |
| 2016/0024370 A1 | 1/2016 | Ba geri et al. |
| 2016/0069159 A1 | 3/2016 | Teklu et al. |
| 2016/0177169 A1 | 6/2016 | Zhang |
| 2016/0186032 A1 | 6/2016 | Yu et al. |
| 2016/0237340 A1 | 8/2016 | Pandya et al. |
| 2016/0289529 A1 | 10/2016 | Nguyen |
| 2017/0009125 A1 | 1/2017 | Shaffer et al. |
| 2018/0223162 A1 | 8/2018 | Al-Yami et al. |
| 2018/0265763 A1 | 9/2018 | Leotaud et al. |

FOREIGN PATENT DOCUMENTS

| | | |
|---|---|---|
| CA | 2594108 A1 | 9/2008 |
| CA | 2810345 A1 | 3/2012 |
| CA | 2745017 A1 | 12/2012 |
| CN | 102120158 A | 7/2011 |
| CN | 101240218 B | 12/2011 |
| CN | 102041138 B | 12/2011 |
| CN | 102321461 A | 1/2012 |
| CN | 102382697 A | 3/2012 |
| CN | 102373042 B | 8/2013 |
| CN | 102464974 B | 8/2013 |
| CN | 103320203 A | 9/2013 |
| CN | 102500141 B | 1/2014 |
| CN | 103571599 A | 2/2014 |
| CN | 102899152 B | 4/2014 |
| CN | 102899154 B | 4/2014 |
| CN | 102977940 B | 11/2014 |
| CN | 104130839 A | 11/2014 |
| CN | 104559954 A | 4/2015 |
| CN | 103351925 B | 7/2015 |
| CN | 102373053 B | 8/2015 |
| CN | 103571578 B | 8/2015 |
| CN | 104830513 A | 8/2015 |
| CN | 104877749 A | 9/2015 |
| CN | 104910881 A | 9/2015 |
| CN | 105038737 A | 11/2015 |
| CN | 103757640 B | 12/2015 |
| CN | 105112036 A | 12/2015 |
| CN | 103773041 B | 1/2016 |
| CN | 105441051 A | 3/2016 |
| CN | 104449893 B | 5/2016 |
| CN | 103555304 B | 6/2016 |
| CN | 105623814 A | 6/2016 |
| CN | 105778992 A | 7/2016 |
| CN | 105861135 A | 8/2016 |
| EP | 0243067 A2 | 10/1987 |
| EP | 0265563 A1 | 5/1988 |
| EP | 0296655 A1 | 12/1988 |
| EP | 315243 A1 | 5/1989 |
| EP | 331158 A2 | 9/1989 |
| EP | 0 395 815 A1 | 11/1990 |
| EP | 1003829 B1 | 5/2004 |
| EP | 1213270 B1 | 2/2005 |
| EP | 2708586 A1 | 3/2014 |
| GB | 2205748 A | 12/1988 |
| GB | 2283036 A | 4/1995 |
| GB | 2 343 447 A | 5/2000 |
| JP | 07109472 A | 4/1995 |
| JP | 2006001789 A | 1/2006 |
| WO | 0108546 A2 | 5/1984 |
| WO | 8911516 A1 | 11/1989 |
| WO | 9402565 A1 | 2/1994 |
| WO | 9530818 A1 | 11/1995 |
| WO | 9640836 A1 | 12/1996 |
| WO | 9730142 A1 | 8/1997 |
| WO | 98/36151 | 8/1998 |
| WO | 9907816 A1 | 2/1999 |
| WO | 9955634 A1 | 11/1999 |
| WO | 01/23703 A1 | 4/2001 |
| WO | 03093641 A1 | 11/2003 |
| WO | 2004/076561 A1 | 9/2004 |
| WO | 2006012622 A2 | 2/2006 |
| WO | 2006/120151 A2 | 11/2006 |
| WO | 2007003885 A2 | 1/2007 |
| WO | 2007/118328 A1 | 10/2007 |
| WO | WO2007/118328 | * 10/2007 |
| WO | 2008081158 A2 | 7/2008 |
| WO | 2009060405 A1 | 5/2009 |
| WO | 2009138383 A1 | 11/2009 |
| WO | 2010/030275 A1 | 3/2010 |
| WO | 2012101594 A1 | 8/2012 |
| WO | 2012158645 A1 | 11/2012 |
| WO | 2013055843 A1 | 4/2013 |
| WO | 2013154435 A1 | 10/2013 |
| WO | 2014107391 A1 | 7/2014 |
| WO | 2014164381 A1 | 10/2014 |
| WO | 2014193507 A1 | 12/2014 |
| WO | 2015000077 A1 | 1/2015 |
| WO | 2015006101 A1 | 1/2015 |
| WO | 2015/038117 A1 | 3/2015 |
| WO | 2015041649 A1 | 3/2015 |
| WO | 2016/189062 A1 | 12/2016 |

OTHER PUBLICATIONS

Non-Final Office Action dated May 25, 2018 pertaining to U.S. Appl. No. 15/485,724, 6 pages.

Akkutlu et al., "Molecular Dynamics Simulation of Adsorpotion from Microemulsions and Surfactant Micellar Solutions at Solid-Liquid, Liquid-Liquid and Gas-Liquid Interfaces", Tech Connector World Innovation Conference & Expo, Jun. 15-18, 2014, Washington D.C.

Fraser, Greig, "Method for Determining the Bioconcentration Factor of Linear Alcohol Ethoxylates", SPE Offshore Europe Oil and Gas Conference and Exhibition, Aberdeen, GB, Sep. 8-11, 2009, Society of Petroleum Engineers.

(56) References Cited

OTHER PUBLICATIONS

Inoue et al., "Interactions Between Engine Oil Additive", J. Japan Petrol. Inst., 1981, 24 (2), 101-107.
Joshi et al., "Physiochemical Behaviour of Ternary System Based on Coconut Oil/C12/E8/n-pentanol/Water", J. Surface Sci. Technol., 2013, 29 (1-2), 1-13.
Lim, Jongchoo, "Solubilization of Mixture of Hydrocarbon Oils by C12e 8 Nonionic Surfactant Solution", Journal of the Korean Industrial and Engineering Chemistry, 2008, 19, 59-65.
Luan et al., "Foaming Property for Anionic-Nonionic Gemini Surfactant of Polyalkoxylated Ether Sulfonate", Oilfield Chemistry, Tsinghua Tongfang Knowledge Network Technology Co., Ltd., 2006.
Min et al., "Research on Coking Dust Wettability of Strong Cohesiveness and Easy Mudding", Safety in Coal Mines, Tsinghua Tongfang Knowledge Network Technology Co., Ltd., 2006.
Mitchell et al., "Measurement of HTHP Fluid-Loss Equipment and Test Fluids with Thermocouples", American Association of Drilling Engineers, AADE Drilling Fluids Conference, Houston TX, Apr. 6-7, 2004.
Nelson, Erik B., "Well Cementing Fundamentals", Oilfield Review, Summer 2012, vol. 24, No. 2, 59-60, Schlumberger.
Paswan et al., "Development of Jatropha oil-in-water emulsion drilling mud system", Journal of Petroleum Science and Engineering, 2016, vol. 144, p. 10-18.
Sun et al., "Synthesis and Salt Tolerance Determination of Aliphatic Alcohol Polyoxyethylene Ethers Sulfonate Series", Journal of Chemical Industry & Engineering, Tsinghua Tongfang Knowledge Network Technology Co., Ltd., 2006.
Non-Final Office Action dated Jan. 16, 2018 pertaining to U.S. Appl. No. 15/485,479, filed Apr. 12, 2017.
International Search Report and Written Opinion dated May 25, 2018, pertaining to International Application No. PCT/US2018/016167, filed Jan. 31, 2018, 20 pages.
International Search Report and Written Opinion dated May 29, 2018 pertaining to International Application No. PCT/US2018/015207 filed Jan. 25, 2018, 15 pages.
Office Action pertaining to U.S. Appl. No. 15/489,927 dated Jul. 6, 2018.
Office Action pertaining to U.S. Appl. No. 16/002,672 dated Sep. 14, 2018.
Office Action pertaining to. U.S. Appl. No. 16/002,669 dated Sep. 21, 2018.
Final Rejection dated Oct. 9, 2018 pertaining to U.S. Appl. No. 15/496,794.
Sabicol TA Series Synthetic Alcohol Ethoxylates, SGS, 2013, pp. 1-3, retrieved Sep. 28, 2018 from http://www.latro.com.tr/upload/1499842623-t2_pdf (Year: 2013).
International Search Report pertaining to International Application No. PCT/US2018/015191, filed Jan. 25, 2018, 6 pages.
Written Opinion pertaining to International Application No. PCT/US2018/015191, filed Jan. 25, 2018, 8 pages.
International Search Report and Written Opinion dated Mar. 16, 2018 pertaining to International Application No. PCT/US2018/015140.
International Search Report pertaining to International Application No. PCT/US2018/014986, filed Jan. 24, 2018, 8 pages.
Written Opinion pertaining to International Application No. PCT/US2018/014986, filed Jan. 24, 2018, 12 pages.
International Search Report and Written Opinion dated Apr. 3, 2018 for PCT/US2018/016182 Filed Jan. 31, 2018. pp. 1-13.
International Search Report and Written Opinion dated Apr. 3, 2018, pertaining to International Application PCT/US2018/016447, filed Feb. 1, 2018, 14 pages.
International Search Report and Written Opinion dated Apr. 20, 2018, pertaining to International Application PCT/US2018/016365, filed Feb. 1, 2018, 16 pages.
International Search Report and Written Opinion dated Apr. 20, 2018, pertaining to International Application PCT/US2018/016414, filed Feb. 1, 2018, 14 pages.
International Search Report and Written Opinion dated Apr. 16, 2018, pertaining to International Application PCT/US2018/016415, filed Feb. 1, 2018, 13 pages.
Non-Final Office Action dated Apr. 30, 2018 pertaining to U.S. Appl. No. 15/586,543, filed May 4, 2017.
Non-Final Office Action dated May 1, 2018 pertaining to U.S. Appl. No. 15/496,794, filed Apr. 25, 2017.
Shell Chemicals, HLB numbers, solvent miscibility and emulsification characteristics of NEODOL ethoxylates, retrieved Apr. 26, 2018 from https://www.shel.com/business-customers/chemicals/our-products/higher-olefins-and-derivatives/neodol-alchols-and-ethoxylates/_jcr_contents/par/tabbedcontent/tab_1780231844/textimage.
Office Action dated Jun. 10, 2019 pertaining to U.S. Appl. No. 15/920,879, filed Mar. 14, 2018, 29 pgs.
Office Action dated Jun. 12, 2019 pertaining to U.S. Appl. No. 16/002,669, filed Jun. 7, 2018, 33 pgs.
Office Action dated Jun. 14, 2019 pertaining to U.S. Appl. No. 15/489,854, filed Apr. 18, 2017, 20 pgs.
Office Action dated Jun. 24, 2019 pertaining to U.S. Appl. No. 16/037,493, filed Jul. 17, 2018, 31 pgs.
Office Action dated Feb. 27, 2019 pertaining to U.S. Appl. No. 15/922,077, filed Mar. 15, 2018, 69 pgs.
Notice of Allowance and Fee(s) Due dated Feb. 21, 2019 pertaining to U.S. Appl. No. 15/489,927, filed Apr. 18, 2017, 27 pgs.
Office Action dated Mar. 13, 2019 pertaining to U.S. Appl. No. 15/922,065, filed Mar. 15, 2018, 77 pgs.
Office Action dated Mar. 27, 2019 pertaining to U.S. Appl. No. 15/581,136, filed Apr. 28, 2017, 20 pgs.
Office Action dated Dec. 12, 2018 pertaining to U.S. Appl. No. 15/581,136, filed Apr. 28, 2017.
Office Action dated Dec. 19, 2018 pertaining to U.S. Appl. No. 15/489,930, filed Apr. 18, 2017.
Notice of Allowance and Fee(s) Due dated Jan. 8, 2019 pertaining to U.S. Appl. No. 15/485,479, filed Apr. 12, 2017.
Office Action dated Jan. 17, 2019 pertaining to U.S. Appl. No. 15/485,724, filed Apr. 12, 2017.
Office Action dated Feb. 11, 2019 pertaining to U.S. Appl. No. 15/496,794, filed Apr. 25, 2017, 6 pgs.
Office Action dated Feb. 11, 2019 pertaining to U.S. Appl. No. 15/920,879, filed Mar. 14, 2018, 38 pgs.
Office Action dated Feb. 7, 2019 pertaining to U.S. Appl. No. 16/002,669, filed Jun. 7, 2018, 54 pgs.
Office Action dated Feb. 21, 2019 pertaining to U.S. Appl. No. 16/037,493, filed Jul. 17, 2018, 52 pgs.
Office Action dated Jan. 24, 2019 pertaining to U.S. Appl. No. 15/489,854, filed Apr. 18, 2017, 46 pgs.
Office Action dated Apr. 4, 2019 pertaining to U.S. Appl. No. 15/586,543, filed May 4, 2017, 23 pgs.
Office Action dated Apr. 8, 2019 pertaining to U.S. Appl. No. 15/660,118, filed Jul. 26, 2017, 76 pgs.
Notice of Allowance and Fee(s) Due dated May 15, 2019 pertaining to U.S. Appl. No. 15/922,077, filed Mar. 15, 2018, 27 pgs.
U.S. Office Action dated Apr. 11, 2019 pertaining to U.S. Appl. No. 15/628,892, filed Jun. 21, 2017, 34 pgs.
U.S. Notice of Allowance dated Apr. 24, 2019 pertaining to U.S. Appl. No. 15/485,724, filed Apr. 12, 2017, 23 pgs.
U.S. Notice of Allowance dated Apr. 26, 2019 pertaining to U.S. Appl. No. 15/489,930, filed Apr. 18, 2017, 14 pgs.
Examination Report for Application No. GC2018-34707 dated Jul. 21, 2019.
Examination Report for Application No. GC2018-34710 dated Jul. 22, 2019.
Examination Report for Application No. GC2018-34701 dated Jul. 29, 2019.
Examination Report for Application U.S. Pat. No. 3,052,276 dated Sep. 5, 2019.
Examination Report for Application No. GC2018-34711 dated Jul. 28, 2019.
Examination Report for Application No. GC2018-34700 dated Aug. 21, 2019.
Examination Report for Application No. GC2018-34699 dated Aug. 21, 2019.

(56) References Cited

OTHER PUBLICATIONS

International Preliminary Report on Patentability for Application No. PCT/US2018/016415 dated Aug. 15, 2019.
U.S. Office Action dated Jul. 3, 2019 pertaining to U.S. Appl. No. 15/496,794, filed Apr. 25, 2017, 52 pgs.
U.S. Office Action dated Jul. 2, 2019 pertaining to U.S. Appl. No. 16/039,525, filed Jul. 19, 2018, 75 pgs.
U.S. Office Action dated Jul. 2, 2019 pertaining to U.S. Appl. No. 15/586,555, filed May 4, 2017, 92 pgs.
"Tridecyl Alcohol Ethoxylate," 2016, retrieved Jun. 28, 2019 from http://webcache.goggleusercontent.com/search?q=cache:OiTX5lz527kJ:https://emochemicals.com/Ethoxylates/Ethoxylates/TRIDECYL-ALCOHOL-ETHOXYLATE&hl=en&gl=us&strip=1&vwsrc=0 (Year: 2016).
Notice of Allowance and Fee(s) Due dated Jul. 22, 2019 pertaining to U.S. Appl. No. 15/922,065, filed Mar. 15, 2018, 27 pgs.
Notice of Allowance and Fee(s) Due dated Jul. 31, 2019 pertaining to U.S. Appl. No. 15/628,892, filed Jun. 21, 2017, 19 pgs.
Final Rejection dated Aug. 5, 2019 pertaining to U.S. Appl. No. 15/586,543, filed May 4, 2017, 38 pgs.
Office Action dated Jul. 30, 2019 pertaining to U.S. Appl. No. 15/581,136, filed Apr. 28, 2017, 29 pgs.
Office Action dated Oct. 22, 2019 pertaining to U.S. Appl. No. 16/039,525, filed Jul. 19, 2018, 32 pgs.
Notice of Allowance and Fee(s) Due dated Nov. 5, 2019 pertaining to U.S. Appl. No. 15/586,555, filed May 1, 2017, 29 pg.
Office Action dated Oct. 23, 2019 pertaining to U.S. Appl. No. 15/660,118, filed Jul. 26, 2017, 45 pgs.
Office Action dated Oct. 24, 2019 pertaining to U.S. Appl. No. 16/202,600, filed Nov. 28, 2018, 84 pgs.
Notice of Allowance and Fee(s) Due dated Aug. 21, 2019 pertaining to U.S. Appl. No. 15/920,879, filed Mar. 14, 2018, 13 pgs.
Notice of Allowance and Fee(s) Due dated Aug. 28, 2019 pertaining to U.S. Appl. No. 16/451,167, filed Jun. 25, 2019, 43 pgs.
Notice of Allowance and Fee(s) Due dated Oct. 11, 2019 pertaining to U.S. Appl. No. 16/037,493, filed Jul. 17, 2018, 17 pgs.
Notice of Allowance and Fee(s) Due dated Oct. 2, 2019 pertaining to U.S. Appl. No. 15/489,854, filed Apr. 18, 2017, 13 pgs.
Examination Report for Application No. GC2018-34700 dated Dec. 18, 2019.
Examination Report for Application No. GC2018-34699 dated Dec. 31, 2019.
Examination Report for Application No. GC2018-34697 dated Dec. 26, 2019.
Office Action dated Feb. 27, 2020 pertaining to U.S. Appl. No. 16/202,600, filed Nov. 28, 2018, 22 pgs.
Notice of Allowance and Fee(s) Due dated Mar. 5, 2020 pertaining to U.S. Appl. No. 16/002,669, filed Jun. 7, 2018, 12 pgs.
Examination Report for Application No. GC2018-34705 dated Oct. 27, 2019.
Nelson, E.B. Well cementing, vol. 28, pp. 5-25 through 5-34, ISBN 0-444-88751-2 (Year: 1990).
Office Action dated Dec. 5, 2019 pertaining to U.S. Appl. No. 15/496,794, filed Apr. 25, 2017, 34 pgs.
Office Action dated Dec. 13, 2019 pertaining to U.S. Appl. No. 15/586,543, filed May 4, 2017, 27 pgs.
Office Action dated Dec. 13, 2019 pertaining to U.S. Appl. No. 15/581,136, filed Apr. 28, 2017, 33 pgs.
Notice of Allowance and Fee(s) Due dated Jan. 17, 2020 pertaining to U.S. Appl. No. 15/660,118, filed Jul. 26, 2017, 10 pgs.
Notice of Allowance and Fee(s) Due dated Jan. 9, 2020 pertaining to U.S. Appl. No. 16/002,669, filed Jun. 7, 2018, 35 pgs.

\* cited by examiner

INVERT EMULSION BASED DRILLING FLUID AND METHODS OF USING SAME

CROSS REFERENCE TO RELATED APPLICATIONS

This application claims priority to U.S. Provisional Patent Application Ser. No. 62/454,189 filed Feb. 3, 2017 and U.S. Provisional Patent Application Ser. No. 62/454,192 filed Feb. 3, 2017, both of which are incorporated by reference herein in their entirety.

TECHNICAL FIELD

Embodiments of the present disclosure generally relate to drilling fluid compositions used for drilling oil wells and to methods of drilling subterranean wells using the drilling fluid compositions. More specifically, embodiments of the present disclosure generally relate to packer fluid compositions comprising a viscosifier package comprising a combination of a fatty acid and an aliphatic polyester.

BACKGROUND

Oil and gas hydrocarbons are naturally occurring in some subterranean formations. During drilling operations, a drilling fluid, which may also be referred to as drilling mud, is circulated through the wellbore to cool the drill bit, to convey rock cuttings to the surface, or to support the wellbore against collapse of the wellbore and against intrusion of fluids from the formation, among other purposes. One type of drilling fluid includes packer fluids which are pumped into an annular opening between the casing and the wellbore wall or between adjacent and concentric strings of pipe extending into the wellbore. Packer fluids are also useful for the containment of reservoirs via hydrostatic pressure and reduction of the pressure gradient between the wellbore wall and casing to prevent wellbore collapse. In certain operations, packer fluids are also used to contact a packer, such as a swellable packer or bridge plug, and can be used for sand control, gravel packing, and workover operations. Drilling fluids, including packer fluids, are formulated to have certain fluid characteristics, such as density and rheology for example, which allow the drilling fluid to perform these functions.

SUMMARY

However, there is an ongoing need for drilling fluids, and specifically packer fluids, which are viscous, insulative, and pumpable at low surface temperatures, such as below 0° C.

Embodiments of the present disclosure are directed to drilling fluid compositions having a viscosifier package comprising a combination of a fatty acid and aliphatic polyester and methods for drilling a subterranean well using the drilling fluid compositions having the viscosifier package.

According to one or more embodiments, a drilling fluid composition includes a base fluid, one or more additives, and a viscosifier package. The base fluid is an invert emulsion comprising oil and water. Further, the one or more additives is chosen from an emulsifier, a weighting material, a fluid-loss control additive, or an alkaline compound. The viscosifier package includes a fatty acid having 6 or more carbon atoms and an aliphatic polyester. The drilling fluid composition has a yield point of from 30 $lb_f/100$ $ft^2$ to 100 $lb_f/100$ $ft^2$ measured according to the formula: yield point= [2×(300 rpm shear rate)]−(600 rpm shear rate) and a low shear yield point of from 10 $lb_f/100$ $ft^2$ to 40 $lb_f/100$ $ft^2$ measured according to the formula: low shear yield point= [2×(3 rpm shear rate)]−(6 rpm shear rate).

According to another aspect, a method of drilling a subterranean well includes operating a drill in a wellbore in the presence of a drilling fluid composition. The drilling fluid composition includes a base fluid, one or more additives, and a viscosifier package. The base fluid is an invert emulsion comprising oil and water. Further, the one or more additives is chosen from an emulsifier, a weighting material, a fluid-loss control additive, or an alkaline compound. The viscosifier package includes a fatty acid having 6 or more carbon atoms and an aliphatic polyester. The drilling fluid composition has a yield point of from 30 $lb_f/100$ $ft^2$ to 100 $lb_f/100$ $ft^2$ measured according to the formula: yield point= [2×(300 rpm shear rate)]−(600 rpm shear rate) and a low shear yield point of from 10 $lb_f/100$ $ft^2$ to 40 $lb_f/100$ $ft^2$ measured according to the formula: low shear yield point= [2×(3 rpm shear rate)]−(6 rpm shear rate).

Additional features and advantages of the described embodiments will be set forth in the detailed description which follows, and in part will be readily apparent to those skilled in the art from that description or recognized by practicing the described embodiments, including the detailed description which follows and the claims.

DETAILED DESCRIPTION

Embodiments of the present disclosure are directed to viscosifier packages for drilling fluids, in particular to drilling fluid compositions incorporating the viscosifier package. The viscosifier package is a combination of a fatty acid and an aliphatic polyester. An example drilling fluid composition incorporating the viscosifier package includes a base fluid, one or more additives including emulsifiers, weighting material, fluid-loss control additives, or alkaline compounds, and the viscosifier package with a fatty acid having 6 or more carbon atoms and an aliphatic polyester. The drilling fluid composition with the viscosifier package comprising both a fatty acid and an aliphatic polyester has enhanced rheology compared to a drilling fluid with neither a fatty acid nor an aliphatic polyester or with only a fatty acid.

To drill a subterranean well, a drill string, including a drill bit and drill collars to weight the drill bit, is inserted into a predrilled hole and rotated to cause the drill bit to cut into the rock at the bottom of the hole. The drilling operation produces rock fragments. To remove the rock fragments from the bottom of the wellbore, a drilling fluid, such as the drilling fluid composition, is pumped down through the drill string to the drill bit. The drilling fluid cools the drill bit and lifts the rock fragments known as cuttings away from the drill bit. The drilling fluid carries the cuttings upwards as the drilling fluid is recirculated back to the surface. At the surface, the cuttings are removed from the drilling fluid through a secondary operation, and the drilling fluid is recirculated back down the drill string to the bottom of the wellbore for collection of further cuttings. It will be appreciated by one skilled in the art that multiple terms familiar to those skilled in the art may be used to describe the same thing. For example, a subterranean well may alternatively be called a borehole or wellbore and usage of a single term is meant to encompass each of the related terms as well.

Drilling fluids include drilling muds, packer fluids, and completion fluids. As used herein, "drilling fluid" means any fluid used to aid the drilling of boreholes into subterranean formations. As used herein, "completion fluids" are solids-free liquid used to "complete" an oil or gas well. Specifically, this fluid is placed in the well to facilitate final operations prior to initiation of production, such as setting screens production liners, downhole valves or shooting perforations into the producing zone. The fluid is meant to control a well should downhole hardware fail, without damaging the producing formation or completion components. As used herein, a packer fluid is a fluid that is left in the annular region of a well between tubing and outer casing above a packer. The main functions of a packer fluid are: (1) to provide hydrostatic pressure in order to lower differential pressure across the sealing element, (2) to lower differential pressure on the wellbore and casing to prevent collapse and (3) to protect metals and elastomers from corrosion. Generically, drilling fluids serve a number of functions with different types specializing in a particular function or functions. In one or more embodiments, the drilling fluid composition assists in the removal of cuttings from the bottom of a borehole during drilling operations. The drilling fluid composition suspends the cuttings and weighted material transports the cutting to the borehole surface with the drilling fluid composition. Additionally, the drilling fluid composition may absorb gases in the borehole, such as carbon dioxide ($CO_2$), hydrogen sulfide ($H_2S$), and methane ($CH_4$), and transport them to the borehole surface for release, sequestration, or burn-off. In further embodiments, the drilling fluid composition also provides a cooling and lubrication functionality for cooling and lubrication of the bit and drill string utilized in boring operations. The drilling fluid composition additionally provides buoyancy to the drill string relieving the tension on the drill string as the length of the borehole increases. In embodiments, the drilling fluid composition also controls subsurface pressures. Specifically, the drilling fluid composition provides hydrostatic pressure in the borehole to provide support to the sidewalls of the borehole and prevent the sidewalls from collapsing and caving in on the drill string. Additionally, the drilling fluid composition provides hydrostatic pressure in the bore to prevent fluids in the downhole formations from flowing into the borehole during drilling operations.

Under certain extreme downhole conditions, such as excessive temperature or difficult formations, some of the properties of the drilling fluid may be altered. For example, interaction of a drilling fluid with a formation having swelling clay, excessive solids content, or both, or subjecting the drilling fluid to extreme downhole temperatures. The temperatures, which range from surface temperature (ambient temperature) up to 500° F. (260° C.), may cause the drilling fluid to thicken or thin, excessively increase or decrease in viscosity, or any combination of these. Controlling the rheology of the drilling fluid can help to prevent barite sag, good cuttings disposal from the wellbore. In some drilling scenarios, a drilling fluid having an increased density, and therefore increased solids content, may enable drilling of a pressurized formation or may be used to control and kill a flowing downhole formation. A flowing downhole formation refers to a formation in which the fluid in the formation is flowing into the wellbore. The increased concentration of solids and increased density of the drilling fluids used in these applications increase the ability of the drilling fluids to support the wellbore and provide enhanced hydrostatic pressure to prevent fluids in the formation from flowing into the wellbore.

The viscosifier package imparts enhanced rheology to the drilling fluid composition thereby gelling the drilling fluid composition. The synergistic effect of both the fatty acid and the aliphatic polyester imparts the enhanced rheology. Without wishing to be bound by theory, it is believed that the aliphatic polyester undergoes hydrolysis to create smaller chain products which along with the fatty acid results in the synergistic combination and increased rheology of the drilling fluid composition. For example, polylactic acid may undergo hydrolysis to generate lactic acid. The lactic acid, which has a smaller chain than polylactic acid, along with the fatty acid generates a synergistic combination which increases the rheology of the fluid. Mixing of lactic acid and fatty acid in the fluid at the surface will lead to a thick fluid with a high yield point (YP). Such a fluid may be difficult to pump. Smaller chain lactic acid and longer chain fatty acid can lead to good packing of the molecules at the oil-water interface in the drilling fluid thereby enhancing the rheology of the fluid.

In one or more embodiments, the weight ratio of the fatty acid to the aliphatic polyester is in the range of 1:60 to 60:1. In further embodiments, the weight ratio of the fatty acid to the aliphatic polyester is in the range of 1:40 to 40:1, 1:20 to 20:1, 1:10 to 10:1, 1:5 to 5:1, 1:4 to 4:1, 1:3 to 3:1, 1:3 to 2:1, or 1:3 to 1:1. In yet further embodiments, the weight ratio of the fatty acid to the aliphatic polyester are in the range of 1:3 to 2:3 or approximately 1:2.

In various embodiments, the aliphatic polyester comprises one or more polyesters chosen from polylactic acid, polyglycolic acid, poly(lactic-co-glycolic acid), polycaprolactone, and polyhydroxybutyrate.

A fatty acid is a carboxylic acid with a long aliphatic chain, which is either saturated or unsaturated. Most naturally occurring fatty acids have an unbranched chain of an even number of carbon atoms, from 4 to 28. In one or more embodiments, the fatty acid is a long chain fatty acid having a carbon chain of 12 to 36 carbons. In further embodiments, the drilling fluid composition comprises fatty acid with a carbon chain of 14 to 24 carbons, 16 to 22 carbons, or 16 to 18 carbons.

As stated above, the drilling fluid composition includes at least a base fluid, the viscosifier package, and one or more additives, which may be used to change one or more characteristics of the drilling fluid. In one or more embodiments the drilling fluid composition comprises from 0.33 to 15 pounds per barrel (lb/bbl) of the viscosifier package, based on the total weight of the drilling fluid composition. The viscosifier package must be present in sufficient quantity to gel the drilling fluid composition, but not at an excessive quantity to impede other properties of the drilling fluid composition. Specifically, the amount of viscosifier must be controlled as too little viscosifier will not result in gelling while too much will result in excessive gelling. In further embodiments, the drilling fluid composition comprises from 0.33 to 20 lb/bbl, 0.33 to 15 lb/bbl, 0.33 to 8 lb/bbl, 0.33 to 10 lb/bbl, 1 to 15 lb/bbl, 1 to 10 lb/bbl, 1 to 5 lb/bbl, 3 to 15 lb/bbl, 3 to 10 lb/bbl, or 3 to 5 lb/bbl of the viscosifier package. In yet further embodiments, the drilling fluid composition comprises from 4 to 10 lb/bbl, 4 to 8 lb/bbl, 4 to 5 lb/bbl, or approximately 4.5 lb/bbl of the viscosifier package.

In one or more embodiments, the base fluid of the drilling fluid composition may be a water-in-oil emulsion known as an invert emulsion. Smaller chain lactic acid and longer chain fatty acids may lead to enhanced packing of the molecules at the oil-water interface in the drilling fluid, thereby enhancing the rheology of the fluid. The enhanced packing of the molecules would not work in a water based drilling fluid.

In water-in-oil emulsions or invert emulsions, oil is a continuous phase and water is dispersed in the continuous oil phase by emulsification so that the drilling fluid does not have a distinct water layer. The oil may be a natural oil or a synthetic oil. The choice of oils may vary based on multiple factors. For example, the choice of oils may depend on the availability of the oil, environmental concerns and cost. Diesel is more readily available and thus more cost effective but environmentally unfriendly. Mineral oils and synthetic oils are environmentally friendly but can be costly. The water in the base fluid may include one or more of deionized, tap, distilled or fresh waters; natural, brackish and saturated salt waters; natural, salt dome, hydrocarbon formation produced or synthetic brines; filtered or untreated seawaters; mineral waters; and other potable and non-potable waters containing one or more dissolved salts, minerals or organic materials. Normally, a brine is chosen as the preferred internal phase. This is done to maintain the osmotic balance between the fluid and the formation. Typically calcium chloride brine having a concentration between 10% w/w to 39% w/w of solution is chosen as the internal phase. The calcium chloride brine is formed from water and $CaCl_2$. In one or more embodiments, the drilling fluid composition comprises from 10 to 45 lb/bbl, 20 to 40 lb/bbl, 25 lb/bbl to 35 lb/bbl, or approximately 30 lb/bbl of the $CaCl_2$. In one or more embodiments, the drilling fluid composition comprises from 30 to 150 lb/bbl, 50 to 140 lb/bbl, 70 lb/bbl to 130 lb/bbl, 90 lb/bbl to 125 lb/bbl, or approximately 115 lb/bbl of the brine (water and $CaCl_2$).

In one or more embodiments, the base fluid comprises an oil to water ratio by volume of 50:50 to 95:05. In further embodiments, the base fluid comprises an oil to water ratio by weight of 50:50 to 80:20, 50:50 to 75:25, 55:45 to 85:15, 60:40 to 85:15, 65:35 to 85:15, 70:30 to 85:15, 60:40 to 80:20, or 65:35 to 75:25. In yet further embodiments, the base fluid comprises an oil to water ratio by volume of 68:32 to 72:28 or approximately 70:30.

The drilling fluid composition may have a weight percent of base fluid of from 1 to 99 wt. %, from 20 wt. % to 80 wt. %, from 30 wt. % to 70 wt. %, from 40 wt. % to 60 wt. %, or from 45 wt. % to 55 wt. % based on the total weight of the drilling fluid composition. Said another way, the drilling fluids may include from 5 lb/bbl to 850 lb/bbl, 100 lb/bbl to 750 lb/bbl, 150 lb/bbl to 600 lb/bbl, or 200 lb/bbl to 300 lb/bbl of base fluid. In embodiments, the drilling fluid composition contains an amount of base fluid, which is dependent on application. For example, the amount of oil or the oil to water ratio depends on the mud weight. For lower mud weight, we use low oil to water ratio. At lower mud weight, the fluid has less solids (weighting material) and hence it needs more water than oil to build up the viscosity.

In further embodiments, additives in the drilling fluid composition may include a weighting material. The weighting material has a specific gravity (SG) suited for raising the drilling fluid composition density. In some embodiments, the weighting material may be a particulate solid having a specific gravity sufficient to increase the density of the drilling fluid composition by a certain amount without adding excessive weighting material such that the drilling fluid composition cannot be circulated through the wellbore. The weighting material may have a specific gravity of from 2 grams per cubic centimeter ($g/cm^3$) to 6 $g/cm^3$. Examples of weighting materials include, but are not limited to, barite (minimum SG of 4.20 grams per cubic centimeter ($g/cm^3$)), hematite (minimum SG of 5.05 $g/cm^3$), calcium carbonate (minimum SG of 2.7-2.8 $g/cm^3$), siderite (minimum SG of 3.8 $g/cm^3$), ilmenite (minimum SG of 4.6 $g/cm^3$), other weighting materials, or any combination of these weighting materials. Some example drilling fluid compositions may include barite as the solid.

The weight percent of the weighting material in the drilling fluid composition may be 1 to 99 wt. %, from 20 wt. % to 80 wt. %, from 30 wt. % to 70 wt. %, from 40 wt. % to 60 wt. %, or from 40 wt. % to 50 wt. % based on the total weight of the drilling fluid composition. Said another way, the drilling fluids may include from 5 lb/bbl to 850 lb/bbl, 100 lb/bbl to 750 lb/bbl, 150 lb/bbl to 500 lb/bbl, or 175 lb/bbl to 275 lb/bbl of weighting material. In embodiments, the drilling fluid composition contains an amount of weighting material sufficient to achieve a particular desired density.

Other additives may be incorporated into the drilling fluid to enhance one or more characteristics of the drilling fluid. Examples of other additives include, but are not limited to, emulsifiers, fluid-loss control additives, alkaline compounds, or combinations of these. The drilling fluid may also include pH adjustor, electrolytes, glycols, glycerols, dispersion aids, corrosion inhibitors, defoamers, and other additives or combinations of additives.

An additional viscosifier beyond the viscosifier package may be added to the drilling fluid to impart non-Newtonian fluid rheology to the drilling fluid and to facilitate lifting and conveying rock cuttings to the surface of the wellbore. Examples of viscosifiers may include, but are not limited to, xanthan gum polymer (XC polymer), bentonite, polyacrylamide, polyanionic cellulose, or combinations of these viscosifiers. In some embodiments, the drilling fluid composition may include xanthan gum polymer, which is a polysaccharide secreted by the bacteria *Xanthomonas Campestris* (XC). An example drilling fluid composition may include from 0.01 wt. % to 0.1 wt. % of the xanthan gum polymer. In another example drilling fluid composition, bentonite may be added to the drilling fluid in an amount from 0.01 wt. % to 1 wt. %. Other suitable viscosifiers may be used in the drilling fluid without deviating from the scope of the present subject matter.

The drilling fluid composition may optionally include one or more alkaline compounds for pH adjustment, which may include lime (calcium hydroxide or calcium oxide), soda ash (sodium carbonate), sodium hydroxide, potassium hydroxide, other strong bases, or combinations thereof. It is noted that conjugate bases to acids with a $pK_a$ of more than about 13 are considered strong bases. The pH may be maintained within a range in order to minimize corrosion caused by the drilling fluid on steel tubulars, tanks, pumps, and other equipment contacting the drilling fluid. Additionally, the alkaline compounds may react with gases, such as $CO_2$ or $H_2S$ for example, encountered by the drilling fluid during drilling operations to prevent the gases from hydrolyzing one or more components of the drilling fluid. Some example drilling fluid compositions may optionally include from 0.1 lb/bbl to 10 lb/bbl of alkaline compounds. In some embodiments, the drilling fluid compositions includes from 0.1 lb/bbl to 10 lb/bbl of lime, 0.5 lb/bbl to 5 lb/bbl of lime, or 1 lb/bbl to 2 lb/bbl of lime.

In one or more embodiments, the drilling fluid composition may include from 7 lb/bbl to 25 lb/bbl of emulsifier, from 8 lb/bbl to 20 lb/bbl of emulsifier, or from 9 lb/bbl to 15 lb/bbl of emulsifier. In one or more embodiments, the emulsifier may be an invert emulsifier and oil-wetting agent for synthetic based drilling fluid systems such as a carboxylic acid terminated polyamide. A commercially available carboxylic acid terminated polyamide is LE SUPER-MUL™, available from Halliburton Energy Services, Inc.

In one or more embodiments, fluid-loss control additive may be added to the oil-based drilling fluid composition to reduce the amount of filtrate lost from the oil-based drilling fluid composition into a subsurface formation. Examples of fluid-loss control additives include organophilic (for example, amine-treated) lignite, bentonite, manufactured polymers, and thinners or deflocculants. The drilling fluid composition may include from 1 lb/bbl to 10 lb/bbl of fluid-loss control additive, from 1 lb/bbl to 5 lb/bbl of fluid-loss control additive, from 1.5 lb/bbl to 8 lb/bbl of fluid-loss control additive, or from 1.5 lb/bbl to 2.5 lb/bbl of fluid-loss control additive.

Commercially available example fluid-loss control additives include VERSATROL™, VERSALIG™, ECOTROL™ RD, ONETROL™ HT, EMI 789, and NOVATECH™ F, all commercially available from MI SWACO, Houston, Tex., and DURATONE® HT (organophilic leonardite fluid loss additive) which is commercially available from Halliburton Energy Services, Inc, In one or more embodiments, the fluid-loss control additive may be a methylstyrene/acrylate copolymer filter control agent such as ADAPTA® which is commercially available from Halliburton Energy Services, Inc.

In one or more embodiments, the drilling fluid composition is substantially free of organoclay. For purposes of this disclosure, substantially free of organoclay means the drilling fluid composition comprises less than 0.01 wt. % organoclay. In embodiments, the drilling fluid composition comprises less than 0.001 wt. % organoclay or less than 0.0001 wt. % organoclay. Organoclays, which are solids, may increase the plastic viscosity of the fluid, which is detrimental for a drilling fluid.

The drilling fluid composition may have a density of from 60 pounds of mass per cubic foot (lbm/ft$^3$) to 155 lbm/ft$^3$, from 60 lbm/ft$^3$ to 130 lbm/ft$^3$, from 60 lbm/ft$^3$ to 120 lbm/ft$^3$, from 70 lbm/ft$^3$ to 140 lbm/ft$^3$, from 70 lbm/ft$^3$ to 125 lbm/ft$^3$, from 70 lbm/ft$^3$ to 110 lbm/ft$^3$, from 80 lbm/ft$^3$ to 120 lbm/ft$^3$, from 80 lbm/ft$^3$ to 110 lbm/ft$^3$, or from 80 lbm/ft$^3$ to 100 lbm/ft$^3$, where 1 lbm/ft$^3$ is approximately 16.02 kilograms per cubic meter (kg/m$^3$). In some embodiments, the drilling fluid composition may have a density that is approximately equal to 90 lbm/ft$^3$ (1,442 kg/m$^3$), alternatively commonly referenced as 90 pcf.

During circulation of the drilling fluid composition through the wellbore, the drilling fluid composition accumulated cuttings and other solids. Additionally, the drilling fluid itself has solids dispersed throughout, such as weighting material. During circulation of the drilling fluid composition the solids are continuously mixed and suspended within the drilling fluid composition. However, when circulation of the drilling fluid composition is interrupted or terminated the solids may settle or separate from the bulk of the drilling fluid composition based on the rheology of the drilling fluid composition. Settling of the cuttings and other solids in undesirable because they would accumulate at the bottom of the wellbore and potentially prevent the drill from rotating or completely block the flow path of the drilling fluid composition upon resumption of drilling activities. In an attempt to avoid setting and separation of solids upon interruption of circulation of the drilling fluid composition, the drilling fluid composition may have a yield point of from 30 pounds of force per 100 square feet (lb$_f$/100 ft$^2$) (14.4 Pa) to 100 lb$_f$/100 ft$^2$ (48 Pa) and a low shear yield point of from 10 lb$_f$/100 ft$^2$ (4.8 Pa) to 100 lb$_f$/100 ft$^2$ (48 Pa), where 1 lb$_f$/100 ft$^2$ is approximately 0.48 Pascal (Pa). The elevated yield point and low shear yield point assists in ensuring the drilling fluid composition gels upon interruption of circulation of the drilling fluid composition and thereby entrains the solids within the gel formation to prevent settling.

The viscosifier package also adjusts the rheology and viscosity of the drilling fluid composition when combined with the base fluid and one or more additives. The addition of the viscosifier package including the polylactic acid or other aliphatic polyester results in increased yield points and gel strength. As previously indicated, the increased viscosity, yield point, and gel strength assists in maintaining suspension of solids and cuttings within the drilling fluid composition both during circulation and when circulation is interrupted.

The viscosity of the drilling fluid composition may be measured using a standard oilfield viscometer according to test methods provided in the American Petroleum Institute (API) Recommended Practice For Field Testing Oil-Based Drilling Fluids (RP 13B-2/ISO 10414-1:2002) published August 2014 and incorporated by reference into this disclosure in its entirety. Drilling fluid is placed in an annular space between two concentric cylinders. The outer cylinder is rotated at a constant rotational velocity which produces a torque on the inner cylinder (or spindle) which is measured. The viscosity is reported as shear stress in units of pounds of force per 100 square feet (lb$_f$/100 ft$^2$). The viscometer, which may be a Fann 35 from FANN Instruments, may be used to measure the shear rate of the drilling fluid compositions.

The gel strength refers to the shear stress of the drilling fluid measured at a low shear rate following a defined period of time during which the drilling fluid is maintained in a static state. The shear stress at low shear rate may be measured using a standard oilfield viscometer operated at low rpms, such as at 3 rpm, according to the test methods described in API RP 13B-2. To measure the gel strength, the drilling fluid is first stirred by contacting the drilling fluid with the spindle of the viscometer and operating the viscometer at 600 rotations per minute (rpm) for 10 seconds. The viscometer is then turned off for a period of time (time period). For a 10 second gel strength, the time period is 10 seconds, and for a 10 minute gel strength, the time period is 10 minutes. Other time periods for measuring gel strength are contemplated. During the time period, the drilling fluid comes to rest in a static state. Upon expiration of the time period, the viscometer is turned back on at a low speed, such as 3 rpm, to generate a low shear rate. The viscometer reading is then taken. The gel strength is reported in units of pounds of force per 100 square feet (lb$_f$/100 ft$^2$).

The 10 second gel strength provides an indication of the ability of the drilling fluid composition to gel immediately upon termination of drill rotation and circulation of the drilling fluid composition. Quick or near instantaneous gelling of the drilling fluid composition upon termination of circulation helps ensure solids do not settle before gelling. A sufficiently high 10 second gel strength indicates the drilling fluid composition formed a robust gel quickly after removal of agitation. The drilling fluid compositions, may have a 10 second gel strength of from 10 lb$_f$/100 ft$^2$ to 25 lb$_f$/100 ft$^2$, from 10 lb$_f$/100 ft$^2$ to 20 lb$_f$/100 ft$^2$, from 10 lb$_f$/100 ft$^2$ to 15 lb$_f$/100 ft$^2$, from 10 lb$_f$/100 ft$^2$ to 12 lb$_f$/100 ft$^2$, from 10.5 lb$_f$/100 ft$^2$ to 11.5 lb$_f$/100 ft$^2$, or from 10.8 lb$_f$/100 ft$^2$ to 11.2 lb$_f$/100 ft$^2$. In one or more embodiments, the drilling fluid compositions may have a 10 second gel strength of approximately 11 lb$_f$/100 ft$^2$.

Similarly, the 10 minute gel strength provides an indication of the ability of the drilling fluid composition to sustain a gelled configuration for a sustained period after termination of drill rotation and circulation of the drilling fluid composition. A sufficiently high 10 minute gel strength indicates the drilling fluid composition formed a robust gel which was maintained during periods without agitation. The drilling fluid compositions, may have a 10 minute gel strength of 10 lb$_f$/100 ft$^2$ to 50 lb$_f$/100 ft$^2$, from 10 lb$_f$/100 ft$^2$ to 20 lb$_f$/100 ft$^2$, from 12 lb$_f$/100 ft$^2$ to 25 lb$_f$/100 ft$^2$, from 12 lb$_f$/100 ft$^2$ to 20 lb$_f$/100 ft$^2$, from 12 lb$_f$/100 ft$^2$ to 18 lb$_f$/100 ft$^2$, from 14 lb$_f$/100 ft$^2$ to 16 lb$_f$/100 ft$^2$, or from 14.5 lb$_f$/100 ft$^2$ to 15.5 lb$_f$/100 ft$^2$. In one or more embodiments, the drilling fluid composition may have a 10 minute gel strength of approximately 15 lb$_f$/100 ft$^2$.

The drilling fluid composition behaves as a rigid body at low stress, but flows as a viscous fluid at higher shear stress. The rheology of the drilling fluid composition may be modeled based on Bingham plastic flow behavior. Additionally, the rheological behavior of the drilling fluid composition may be determined by measuring the shear stress on the drilling fluid composition at different shear rates, which may be accomplished by measuring the shear stress, the shear rate, or both on the drilling fluid using a viscometer (FANN 35 rheometer) at 3 rpm, 6 rpm, 300 rpm, and 600 rpm. Rheology measurements were done at 120° F. (48.9° C.). The rheology of the drilling fluid composition may be evaluated from the plastic viscosity (PV) and the yield point (YP), which are parameters from the Bingham plastic rheology model. The PV is related to the resistance of the drilling fluid composition to flow due to mechanical interaction between the solids of the drilling fluid composition and represents the viscosity of the drilling fluid composition extrapolated to infinite shear rate. The PV reflects the type and concentration of the solids in the drilling fluid composition, and a lesser PV is preferred. The PV of the drilling fluid composition may be estimated by measuring the shear rate of the drilling fluid composition using the viscometer at spindle speeds of 300 rotations per minute (rpm) and 600 rpm and subtracting the 300 rpm measurement from the 600 rpm measurement according to Equation 1, which is provided infra. The PV is provided in this disclosure in units of centipoise (cP).

$$PV=(600 \text{ rpm reading})-(300 \text{ rpm reading}) \quad \text{Equation 1}$$

The YP represents the shear stress below which the drilling fluid composition behaves as a rigid body and above which the drilling fluid composition flows as a viscous fluid. Specifically, the YP represents the amount of stress required to move the drilling fluid composition from a static condition. The YP is expressed as a force per area, such as pounds of force per one hundred square feet (lb$_f$/100 ft$^2$). YP provides an indication of the carrying capacity of the drilling fluid composition for rock cuttings through the annulus, which provides an indication the hole-cleaning ability of the drilling fluid composition. Additionally, frictional pressure loss is directly related to the YP. If you have a higher YP, you will have higher pressure loss while the drilling fluid composition is being circulated. A drilling fluid having a YP of equal to or greater than 15 lb$_f$/100 ft$^2$ is considered acceptable for drilling and a YP of equal to or greater than 30 lb$_f$/100 ft$^2$ is considered acceptable for utilization as a packer fluid. The YP is determined by extrapolating the Bingham plastic rheology model to a shear rate of zero. The YP may be estimated from the PV from Equation 1 by subtracting the PV obtained from Equation 1 from the shear rate of the drilling fluid composition measured at 300 rpm according to Equation 2 provided infra.

$$YP=(300 \text{ rpm reading})-PV \quad \text{Equation 2}$$

The yield stress is a parameter obtained from the Herschel Buckley (HB) rheology model. The yield stress may be obtained by fitting the HB model to a shear stress vs. shear rate curve, which is obtained by plotting the dial readings against the corresponding rpm determined on a standard oilfield viscometer. The yield stress indicates the susceptibility of the drilling fluid composition to have barite sag. A high yield stress value is expected to result in a sag resistant drilling fluid composition. The yield stress of the drilling fluid composition may be estimated by calculating the low shear yield point (LSYP). The LSYP is determined by measuring the shear rate of the drilling fluid composition using the viscometer at spindle speeds of 6 rpm and 3 rpm and subtracting the 6 rpm viscometer measurement from twice the 3 rpm viscometer measurement according to Equation 3, which is provided infra.

$$LSYP=[2\times(3 \text{ rpm reading})]-(6 \text{ rpm reading}) \quad \text{Equation 3}$$

The LSYP is expressed as a force per area, such as pounds of force per one hundred square feet (lb$_f$/100 ft$^2$). A drilling fluid having a LSYP of equal to or greater than 5 lb$_f$/100 ft$^2$ considered acceptable for drilling and a LSYP of equal to or greater than 10 lb$_f$/100 ft$^2$ is considered acceptable for utilization as a packer fluid.

In one or more embodiments, the drilling fluid composition may have a YP of from 30 lb$_f$/100 ft$^2$ to 100 lb$_f$/100 ft$^2$, from 30 lb$_f$/100 ft$^2$ to 80 lb$_f$/100 ft$^2$, from 30 lb$_f$/100 ft$^2$ to 70 lb$_f$/100 ft$^2$, from 32 lb$_f$/100 ft$^2$ to 100 lb$_f$/100 ft$^2$, from 32 lb$_f$/100 ft$^2$ to 80 lb$_f$/100 ft$^2$, from 32 lb$_f$/100 ft$^2$ to 70 lb$_f$/100 ft$^2$, from 34 lb$_f$/100 ft$^2$ to 100 lb$_f$/100 ft$^2$, from 34 lb$_f$/100 ft$^2$ to 80 lb$_f$/100 ft$^2$, or from 34 lb$_f$/100 ft$^2$ to 70 lb$_f$/100 ft$^2$. In one or more embodiments, the drilling fluid composition may have a YP of from 30 lb$_f$/100 ft$^2$ to 60 lb$_f$/100 ft$^2$. Alternatively, in some embodiments, the drilling fluid composition may have a YP of from 30 lb$_f$/100 ft$^2$ to 50 lb$_f$/100 ft$^2$.

In one or more embodiments, the drilling fluid composition may have a LSYP of from 10 lb$_f$/100 ft$^2$ to 40 lb$_f$/100 ft$^2$, from 10 lb$_f$/100 ft$^2$ to 30 lb$_f$/100 ft$^2$, from 10 lb$_f$/100 ft$^2$ to 20 lb$_f$/100 ft$^2$, or from 10 lb$_f$/100 ft$^2$ to 18 lb$_f$/100 ft$^2$. In one or more embodiments, the drilling fluid composition may have a LSYP of from 10 lb$_f$/100 ft$^2$ to 25 lb$_f$/100 ft$^2$. Alternatively, in some embodiments, the drilling fluid composition may have a LSYP of from 10 lb$_f$/100 ft$^2$ to 15 lb$_f$/100 ft$^2$.

Drilling fluid compositions containing the viscosifier package may be used in various methods such as methods for drilling subterranean wells. Embodiments of methods for drilling subterranean wells will now be discussed.

The drilling fluid composition that includes the viscosifier package may be used for drilling a subterranean well. According to embodiments, methods of drilling a subterranean well may include operating a drill in a wellbore in the presence of a drilling fluid composition comprising a base fluid, one or more additives including emulsifiers, weighting materials, fluid-loss control additives, or alkaline compounds, and a viscosifier package with a fatty acid having a carbon chain greater than 6 and a polyester chosen from polylactic acid, polyglycolic acid, poly(lactic-co-glycolic acid), polycaprolactone, and polyhydroxybutyrate. The drilling fluid composition has a yield point of from 30 lb$_f$/100 ft$^2$) (14.4 Pa) to 100 lb$_f$/100 ft$^2$ (48 Pa) and a low shear yield point of from 10 lb$_f$/100 ft$^2$ (4.8 Pa) to 40 lb$_f$/100 ft$^2$ (48 Pa) as determined according to test methods provided in API RP 13B-2 (American Petroleum Institute Recommended Procedure 13B-2). The base fluid may be an invert emulsion comprising oil and water. In some example methods, the base fluid is an invert emulsion comprising an oil to water ratio of 50:50 to 95:05.

It will be appreciated that the various embodiments of the drilling fluid composition may be used in the methods of drilling a subterranean well. Additionally, the drilling fluid composition may be circulated through the wellbore during the drilling operation.

EXAMPLES

The following examples illustrate one or more additional features of the present disclosure. It should be understood that these examples are not intended to limit the scope of the disclosure or the appended claims in any manner.

In the following examples, two invert emulsion drilling fluids were prepared containing oil, water, LE SUPERMUL™ (an invert emulsifier and oil-wetting agent for synthetic based drilling fluid systems commercially available from Halliburton Energy Services, Inc.), lime, ADAPTA® (a cross-linked polymer filter control agent commercially available from Halliburton Energy Services, Inc.), starch, lime, calcium chloride, and barite. The first invert emulsion drilling fluid was prepared as a Comparative Example 1 and additionally included a $C_{16}$-$C_{18}$ fatty acid. The second invert emulsion drilling fluid was prepared as an Example 1 and additionally included the viscosifier package, namely $C_{16}$-$C_{18}$ fatty acid and polylactic acid. The physical characteristics of the two prepared invert emulsion drilling fluids are described in Table 3.

A. Example 1 (Comparative)

Invert Emulsion Drilling Fluid without Viscosifier Package

An invert emulsion drilling fluid without the viscosifier package, but the inclusion of the fatty acid component, was formulated as a control sample for comparison with the drilling fluid composition with the viscosifier package. The formulation of the Example 1 (Comparative) invert emulsion drilling fluid is provided subsequently in Table 1. The components of the invert emulsion drilling fluid were added to a vessel and thoroughly mixed. Specifically, Safra oil and LE SUPERMUL™ were added to a vessel and thoroughly mixed for a period of 5 minutes. Subsequently, lime was added and mixed for 5 minutes. Then $C_{16}$-$C_{18}$ fatty acid was added and mixed for 5 minutes. Subsequently, ADAPTA® was added, followed by a 5 minutes mixing period. Then, CaCl$_2$ and water were added, followed by a 5 minutes mixing period, and finally barite was added, followed by a 5 minutes mixing period. The additives were mixed at room temperature using a high speed multimixer.

TABLE 1

Invert Emulsion Drilling Fluid Formulation for Example 1 (Comparative)

| Ingredient | Example 1 (Comparative) Pounds Per Barrel (lb/bbl) |
|---|---|
| Safra oil | 144.4 |
| LE SUPERMUL ™ | 10 |
| Lime | 1.5 |
| $C_{16}$-$C_{18}$ fatty acid | 4.5 |
| ADAPTA ® | 2 |
| CaCl$_2$ | 29.5 |

TABLE 1-continued

Invert Emulsion Drilling Fluid Formulation for Example 1 (Comparative)

| Ingredient | Example 1 (Comparative) Pounds Per Barrel (lb/bbl) |
|---|---|
| Water | 84.9 |
| Barite | 228.9 |
| TOTAL | 505.7 |

B. Example 2

Invert Emulsion Drilling Fluid with Viscosifier Package

An invert emulsion drilling fluid formulation was prepared to include an amount of an viscosifier package according to embodiments of the present disclosure. The viscosifier package comprises $C_{16}$-$C_{18}$ fatty acid and polylactic acid in a 1:2 weight ratio. The components of the invert emulsion drilling fluid of Inventive Example 1, including the viscosifier package, were added to a vessel and thoroughly mixed. Specifically, Safra oil and LE SUPERMUL™ were added to a vessel and thoroughly mixed for a period of 5 minutes. Subsequently, lime was added and mixed for 5 minutes followed by the addition of polylactic acid and a 5 minute mixing period. Then $C_{16}$-$C_{18}$ fatty acid was added and mixed for 5 minutes. Subsequently, ADAPTA® added followed by a 5 minutes mixing period, CaCl$_2$ and water were added followed by a 5 minutes mixing period, and finally barite was added followed by a 5 minutes mixing period. The formulation of Example 2 is listed in Table 2 subsequently provided.

TABLE 2

Invert Emulsion Drilling Fluid Formulation for Example 2

| Ingredient | Example 2 Pounds Per Barrel (lb/bbl) |
|---|---|
| Safra oil | 144.4 |
| LE SUPERMUL ™ | 10 |
| Lime | 1.5 |
| Viscosifier Package | [4.5]* |
| $C_{16}$-$C_{18}$ fatty acid | 1.5 |
| Polylactic Acid | 3.0 |
| ADAPTA ® | 2 |
| CaCl$_2$ | 29.5 |
| Water | 84.9 |
| Barite | 228.9 |
| TOTAL | 505.7 |

*The brackets "[ ]" indicate the total lb/bbl for the entire viscosifier package including the $C_{16}$-$C_{18}$ fatty acid and the polylactic acid.

The invert emulsion drilling fluids of Example 1 (Comparative) and Example 2 were evaluated for viscosity, gel strength, PV, YP, and LSYP according to the methods previously described in this disclosure. The results of these measurements for the invert emulsion drilling fluids of Example 1 (Comparative) and Example 2 are provided in Table 3. Table 3 also includes a calculated change in the 10 second Gel Strength, 10 Minute Gel Strength, PV, YP, and LSYP of Example 2 compared to Example 1 (Comparative).

TABLE 3

Evaluation of the Properties of the Invert Emulsion Drilling Fluids of Example 1 (Comparative) and Example 2

|  | Example 1 (Comparative) | Example 2 |
|---|---|---|
| 600 rpm viscometer reading | 65 | 98 |
| 300 rpm viscometer reading | 38 | 66 |
| 200 rpm viscometer reading | 27 | 53 |
| 100 rpm viscometer reading | 18 | 37 |
| 6 rpm viscometer reading | 6 | 12 |
| 3 rpm viscometer reading | 5 | 11 |
| 10 Second Gel Strength (lb$_f$/100 ft$^2$) | 5 | 11 |
| 10 Minute Gel Strength (lb$_f$/100 ft$^2$) | 6 | 15 |
| PV (cP) | 27 | 32 |
| YP (lb$_f$/100 ft$^2$) | 11 | 34 |
| LSYP (lb$_f$/100 ft$^2$) | 4 | 10 |
| Change in 10 Second Gel Strength (%) | — | +120% |
| Change in 10 Minute Gel Strength (%) | — | +150% |
| Change in PV (%) | — | +18.5% |
| Change in YP (%) | — | +209% |
| Change in LSYP (%) | — | +150% |

As shown in Table 3, the drilling fluid of Example 2, which included the viscosifier package, resulted in a 120% increase in the 10 second gel strength and a 150% increase in the 10 minute gel strength of the drilling fluid compared to the drilling fluid of Example 1 (Comparative). Addition of the viscosifier package, as in Example 1, resulted in an increase in the PV of the drilling fluid compared to the drilling fluid of Example 1 (Comparative). The viscosifier package of Example 2 also resulted in a 209% increase in the YP of the drilling fluid composition and a 150% increase in the LSYP of the drilling fluid composition compared to the drilling fluid of Example 1 (Comparative). As it is desirable for a packer fluid to have a YP of at least 30 lb$_f$/100 ft$^2$ and a LSYP of at least 10 lb$_f$/100 ft$^2$, the respective 209% and 150% increases in YP and LSYP provides a more desirable drilling fluid composition for use as a packer fluid.

The drilling fluid of Example 2 demonstrated improved rheology over the drilling fluid of Comparative Example 1. Specifically, the 10 second gel strength, the 10 minute gel strength, the PV, the YP, and the LSYP for Example 2 all demonstrated increases over the corresponding measurements of Example 1 (Comparative). As previously indicated, the improvement is attributed to the hydrolysis of the aliphatic polyester into shorter carbon chain units when mixed with the fatty acid to yield the improved rheology. Smaller chain lactic acid and longer chain fatty acid can lead to good packing of the molecules at the oil-water interface in the drilling fluid thereby enhancing the rheology of the fluid.

In a first aspect, the disclosure provides a drilling fluid composition including a base fluid, a viscosifier package, and one or more additives chosen from an emulsifier, a weighting material, a fluid-loss control additive, or an alkaline compound. The base fluid is an invert emulsion comprising oil and water. The viscosifier package includes a fatty acid having 6 or more carbon atoms and an aliphatic polyester. The drilling fluid composition has a yield point of from 30 lb$_f$/100 ft$^2$ to 100 lb$_f$/100 ft$^2$ measured according to the formula: yield point=[2×(300 rpm shear rate)]−(600 rpm shear rate) and a low shear yield point of from 10 lb$_f$/100 ft$^2$ to 40 lb$_f$/100 ft$^2$ measured according to the formula: low shear yield point=[2×(3 rpm shear rate)]−(6 rpm shear rate).

In a second aspect, the disclosure provides a drilling fluid composition of the first aspect, in which a weight ratio of fatty acid to polyester in the viscosifier package is 1:60 to 60:1.

In a third aspect, the disclosure provides a drilling fluid composition of either the first or second aspects, in which a weight ratio of fatty acid to polyester in the viscosifier package is 1:3 to 2:3.

In a fourth aspect, the disclosure provides a drilling fluid composition of any of the first through third aspects, in which the drilling fluid composition comprises from 0.33 lb/bbl to 20 lb/bbl of the viscosifier package.

In a fifth aspect, the disclosure provides a drilling fluid composition of any of the first through fourth aspects, in which the fatty acid is a long chain fatty acid having a carbon chain of 12 to 36 carbons.

In a sixth aspect, the disclosure provides a drilling fluid composition of any of the first through fifth aspects, in which the fatty acid has a carbon chain of 16 to 18 carbons.

In a seventh aspect, the disclosure provides a drilling fluid composition of any of the first through sixth aspects, in which the aliphatic polyester is chosen from polylactic acid, polyglycolic acid, poly(lactic-co-glycolic acid), polycaprolactone, and polyhydroxybutyrate.

In an eighth aspect, the disclosure provides a drilling fluid composition of any of the first through sixth aspects, in which the polyester comprises polylactic acid.

In a ninth aspect, the disclosure provides a drilling fluid composition of any of the first through eighth aspects, in which the drilling fluid composition comprises less than 0.01 wt. % organoclay.

In a tenth aspect, the disclosure provides a drilling fluid composition of any of the first through ninth aspects, in which the drilling fluid composition has a 10 second gel strength of from 10 lb$_f$/100 ft$^2$ to 25 lb$_f$/100 ft$^2$ as determined according to test methods provided in API RP 13B-2.

In an eleventh aspect, the disclosure provides a drilling fluid composition of any of the first through tenth aspects, in which the drilling fluid composition has a 10 minute gel strength of from 10 lb$_f$/100 ft$^2$ to 50 lb$_f$/100 ft$^2$ as determined according to test methods provided in API RP 13B-2.

In a twelfth aspect, the disclosure provides a drilling fluid composition of any of the first through eleventh aspects, in which the base fluid comprises an oil to water ratio of 50:50 to 95:05.

In a thirteenth aspect, the disclosure provides a drilling fluid composition of any of the first through twelfth aspects, in which the water is chosen from fresh water, filtered water, distilled water, sea water, salt water, formation brine, produced water, or combinations thereof.

In a fourteenth aspect, the disclosure provides a drilling fluid composition of any of the first through thirteenth aspects, in which the oil is a natural oil.

In a fifteenth aspect, the disclosure provides a drilling fluid composition of any of the first through thirteenth aspects, in which the oil is a synthetic oil.

In a sixteenth aspect, the disclosure provides a drilling fluid composition of any of the first through fifteenth aspects, in which the one or more additives comprises a weighting material.

In a seventeenth aspect, the disclosure provides a drilling fluid composition of any of the first through sixteenth aspects, in which the weighting material is chosen from at least one of barite, calcium carbonate, hematite, siderite, or ilmenite.

In an eighteenth aspect, the disclosure provides a drilling fluid composition of any of the first through seventeenth aspects, in which the drilling fluid composition comprises from 5 lb/bbl to 850 lb/bbl base fluid.

In a nineteenth aspect, the disclosure provides a drilling fluid composition of any of the first through eighteenth aspects, in which the drilling fluid composition comprises from 5 lb/bbl to 850 lb/bbl weighting material.

In a twentieth aspect, the disclosure provides a drilling fluid composition of any of the first through nineteenth aspects, in which the fatty acid is a saturated fatty acid.

In a twenty-first aspect, the disclosure provides a drilling fluid composition of any of the first through twentieth aspects, in which the drilling fluid composition comprises from 0.5 lb/bbl to 10 lb/bbl of the lime.

In a twenty-second aspect, the disclosure provides a drilling fluid composition of any of the first through twenty-first aspects, in which the drilling fluid composition comprises from 7 lb/bbl to 25 lb/bbl of the emulsifier.

In a twenty-third aspect, the disclosure provides a drilling fluid composition of any of the first through twenty-second aspects, in which the drilling fluid composition comprises from 30 lb/bbl to 150 lb/bbl of the brine.

In a twenty-fourth aspect, the disclosure provides a drilling fluid composition of any of the first through twenty-third aspects, in which the drilling fluid composition comprises from 1 lb/bbl to 10 lb/bbl of the fluid-loss control additive.

In a twenty-fifth aspect, the disclosure provides a drilling fluid composition of any of the first through twenty-fourth aspects, in which the drilling fluid composition comprises from 3 lb/bbl to 10 lb/bbl of the viscosifier package.

In a twenty-sixth aspect, the disclosure provides a drilling fluid composition of any of the first through twenty-fifth aspects, in which the base fluid is an invert emulsion comprising oil and a $CaCl_2$ brine.

In a twenty-seventh aspect, the disclosure provides a method of drilling a subterranean well. The method includes operating a drill in a wellbore in the presence of the drilling fluid composition of any of the first through twenty-sixth aspects.

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a composition or formulation should be appreciated as containing, in some embodiments, a mixture of isomers of that constituent. It should be appreciated that the examples supply compositional ranges for various compositions, and that the total amount of isomers of a particular chemical composition can constitute a range.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus it is intended that the specification cover the modifications and variations of the various described embodiments provided such modification and variations come within the scope of the appended claims and their equivalents.

What is claimed is:
1. A drilling fluid composition comprising:
   a base fluid, where the base fluid is an invert emulsion comprising oil and water;
   one or more additives chosen from an emulsifier, a weighting material, a fluid-loss control additive, or an alkaline compound; and
   a viscosifier package, the viscosifier package comprising:
      a fatty acid having 6 or more carbon atoms; and
      an aliphatic polyester,
   the drilling fluid composition having a yield point of from 30 $lb_f/100$ $ft^2$ to 100 $lb_f/100$ $ft^2$ measured according to API recommended practice 13-B2 in accordance with:

$$\text{yield point} = [2 \times (300 \text{ rpm reading})] - (600 \text{ rpm reading})$$

and a low shear yield point of from 10 $lb_f/100$ $ft^2$ to 40 $lb_f/100$ $ft^2$ measured in accordance with:

$$\text{low shear yield point} = [2 \times (3 \text{ rpm reading})] - (6 \text{ rpm reading}),$$

where the drilling fluid composition comprises from 0.33 lb/bbl to 20 lb/bbl of the viscosifier package.

2. The drilling fluid composition of claim 1 where a weight ratio of fatty acid to polyester in the viscosifier package is 1:60 to 60:1.

3. The drilling fluid composition of claim 1 where a weight ratio of fatty acid to polyester in the viscosifier package is 1:3 to 2:3.

4. The drilling fluid composition of claim 1 where the fatty acid is a long chain fatty acid having a carbon chain of 12 to 36 carbons.

5. The drilling fluid composition claim 1 where the fatty acid has a carbon chain of 16 to 18 carbons.

6. The drilling fluid composition of claim 1 where the aliphatic polyester is chosen from polylactic acid, polyglycolic acid, poly(lactic-co-glycolic acid), polycaprolactone, and polyhydroxybutyrate.

7. The drilling fluid composition of claim 1 where the polyester comprises polylactic acid.

8. The drilling fluid composition of claim 1 where the drilling fluid composition comprises less than 0.01 wt. % organoclay.

9. The drilling fluid composition of claim 1 where the drilling fluid composition has a 10 second gel strength of from 10 $lb_f/100$ $ft^2$ to 25 $lb_f/100$ $ft^2$ as determined according to test methods provided in API RP 13B-2.

10. The drilling fluid composition of claim 1 where the drilling fluid composition has a 10 minute gel strength of from 10 $lb_f/100$ $ft^2$ to 50 $lb_f/100$ $ft^2$ as determined according to test methods provided in API RP 13B-2.

11. The drilling fluid composition of claim 1 where the fatty acid is a saturated fatty acid.

12. A method of drilling a subterranean well, the method comprising:
   operating a drill in a wellbore in the presence of a drilling fluid composition comprising:
      a base fluid, where the base fluid is an invert emulsion comprising oil and water;
      one or more additives chosen from an emulsifier, a weighting material, a fluid-loss control additive, or an alkaline compound; and a viscosifier package, the viscosifier package comprising:
  a fatty acid having 6 or more carbon atoms; and
  an aliphatic polyester,
the drilling fluid composition having a yield point of from 30 lb/100 ft² to 100 lb/100 ft² measured according to API recommended practice 13-B2 in accordance with:

yield point=[2×(300 rpm reading)]−(600 rpm reading)

and a low shear yield point of from 10 lb/100 ft² to 40 lb/100 ft² measured in accordance with:

low shear yield point=[2×(3 rpm reading)]−(6 rpm reading), where the drilling fluid composition comprises from 0.33 lb/bbl to 20 lb/bbl of the viscosifier package.

13. The method of drilling a subterranean well of claim 12 where a weight ratio of fatty acid to polyester in the viscosifier package is 1:60 to 60:1.

14. The method of drilling a subterranean well of claim 12 where the drilling fluid composition comprises from 0.33 to 10 lb/bbl of the viscosifier package.

15. The method of drilling a subterranean well of claim 12 where the fatty acid is a long chain fatty acid having a carbon chain of 12 to 36 carbons.

16. The method of drilling a subterranean well of claim 12 where the fatty acid has a carbon chain of 16 to 18 carbons.

17. The method of drilling a subterranean well of claim 12 where the aliphatic polyester is chosen from polylactic acid, polyglycolic acid, poly(lactic-co-glycolic acid), polycaprolactone, and polyhydroxybutyrate.

18. The method of drilling a subterranean well of claim 12 where the drilling fluid composition has a 10 second gel strength of from 10 lb/100 ft² to 25 lb/100 ft² as determined according to test methods provided in API RP 13B-2.

19. The method of drilling a subterranean well of claim 12 where the drilling fluid composition has a 10 minute gel strength of from 10 lb/100 ft² to 50 lb/100 ft² as determined according to test methods provided in API RP 13B-2.

* * * * *

UNITED STATES PATENT AND TRADEMARK OFFICE
CERTIFICATE OF CORRECTION

Page 1 of 1

PATENT NO. : 10,683,447 B2
APPLICATION NO. : 15/612397
DATED : June 16, 2020
INVENTOR(S) : Vikrant Wagle, Abdullah Al-Yami and Nasser AlHareth It is certified that error appears in the above-identified patent and that said Letters Patent is hereby corrected as shown below:

On the Title Page

In page 2, Column 2, item (56), U.S. patent documents, cite no. 34, delete "H1932" and insert --H001932--, therefor.

In page 3, Column 2, item (56), U.S. patent documents, cite no. 32, delete "WO" and insert --EP--, therefor.

In page 4, Column 2, item (56), other publications, cite no. 17, delete "6 pgs" and insert --16 pgs--, therefor.

In page 4, Column 2, item (56), other publications, cite no. 18, delete "38 pgs" and insert --68 pgs--, therefor.

In page 5, Column 1, item (56), other publications, cite no. 11, delete "May 1, 2017" and insert --May 4, 2017--, therefor.

Signed and Sealed this
Eleventh Day of August, 2020

Andrei Iancu
*Director of the United States Patent and Trademark Office*